(12) United States Patent
van Waning

(10) Patent No.: US 9,539,625 B2
(45) Date of Patent: Jan. 10, 2017

(54) STORAGE OF CONTAMINATED MATERIAL

(71) Applicant: Grovawa B.V., Sint-Michielsgestel (NL)

(72) Inventor: Dick van Waning, Sint-Michielsgestel (NL)

(73) Assignee: Grovawa B.V., Sint-Michielsgestel (NL)

( * ) Notice: Subject to any disclaimer, the term of this patent is extended or adjusted under 35 U.S.C. 154(b) by 4 days.

(21) Appl. No.: 14/258,693

(22) Filed: Apr. 22, 2014

(65) Prior Publication Data

US 2015/0298184 A1 Oct. 22, 2015

(51) Int. Cl.
*B09B 1/00* (2006.01)

(52) U.S. Cl.
CPC .............. *B09B 1/002* (2013.01); *B09B 1/008* (2013.01)

(58) Field of Classification Search
CPC ................................ B09B 1/008; B09B 1/002
See application file for complete search history.

(56) References Cited

U.S. PATENT DOCUMENTS

| 3,375,666 | A | * | 4/1968 | Sutton ..................... C02F 3/046 166/305.1 |
| 3,379,013 | A | | 4/1968 | Slagle et al. |
| 3,513,100 | A | * | 5/1970 | Stogner .............................. 588/3 |
| 3,901,621 | A | * | 8/1975 | Coles ............................... 415/74 |
| 4,266,889 | A | * | 5/1981 | Rail et al. ....................... 405/223 |
| 4,592,675 | A | * | 6/1986 | Scales et al. ..................... 405/19 |
| 5,022,788 | A | * | 6/1991 | Baird ......................... 405/129.35 |
| 5,109,933 | A | * | 5/1992 | Jackson .......................... 175/66 |
| 5,405,223 | A | * | 4/1995 | Sirevag ..................... 405/129.2 |
| 5,463,172 | A | * | 10/1995 | Marvy ........................... 588/252 |
| 5,915,885 | A | | 6/1999 | Hermans et al. |
| 2012/0123180 | A1 | * | 5/2012 | Paulsen ......................... 588/250 |

FOREIGN PATENT DOCUMENTS

| GB | 2151839 A | * | 7/1985 | ............... G21F 9/24 |
| GB | 2237273 A | | 10/1989 | |
| JP | 58-139775 A | | 8/1983 | |
| JP | 64-048922 A | | 2/1989 | |
| JP | 04-290541 A | | 10/1992 | |

* cited by examiner

*Primary Examiner* — John Kreck
(74) *Attorney, Agent, or Firm* — The Webb Law Firm

(57) ABSTRACT

The invention relates to the storage of contaminated material under a water layer, in particular the storage of bottom ash. The invention provides for this purpose a method for storing a contaminated material under a water layer, comprising the processing steps of supplying the contaminated material, supplying ground material, mixing the contaminated material with the ground material and arranging the mixture of contaminated material and ground material in or under a retention layer situated under a water layer, and wherein the mixture is not in contact with the water layer, and the retention layer comprises ground material. The invention also provides an installation for storing contaminated material and a composition comprising the contaminated material.

8 Claims, 4 Drawing Sheets

STORAGE OF CONTAMINATED MATERIAL

BACKGROUND OF THE INVENTION

Field of the Invention

The invention relates to a method and installation for storing contaminated material. The invention relates particularly to the storage of contaminated material under wet conditions. The invention further relates to a composition suitable for storing contaminated material, particularly for storing bottom ash under wet conditions.

Description of Related Art

Several tens of millions of tons of contaminated material are generated every year by waste processing plants. This material is usually disposed of as building material in the road construction industry, for instance as filler material mainly in embankments for and as elevations under motorways or in the construction of sound bathers. Such material is also used as landfill covering.

The application of contaminated filler material is however limited by the danger of leaching of heavy metals, sulphates and chlorides, which can result in contamination of the groundwater. For this reason the storing of contaminated materials at a landfill site is subject to strict requirements, especially when these materials can come into contact with drinking water or recreational water basins. A further increase in the applicability of contaminated material would be very useful to industry, government authorities and social organizations.

An object of the present invention is therefore to provide an improved method and installation for storing contaminated material.

SUMMARY OF THE INVENTION

The invention provides for this purpose a method for storing a contaminated material under a water layer, comprising the processing steps of: a) supplying the contaminated material, b) supplying ground material, c) mixing the contaminated material with the ground material, and d) arranging the mixture of contaminated material and ground material in or under a retention layer situated under a water layer, wherein in processing step d) the mixture is not in contact with the water layer, and the retention layer comprises ground material.

An advantage of the method according to the present invention is that arranging a mixture of contaminated material and ground material in or under a retention layer situated under a water surface or groundwater level greatly reduces leaching of contamination, including heavy metals, compared to a contaminated material arranged in a retention layer situated above the water surface or groundwater level. In the known present situation contaminated material is arranged in a retention layer, wherein the retention layer consisting of clay or plastic film is situated above a water surface or groundwater level. External factors, including atmospheric influences such as rainwater, moisten the retention layer, with the result that under the influence of gravitational force the water percolates through the contaminated material. As a result of the percolating water there occurs leaching of contaminants, including heavy metals, from the isolated contaminated material. The method according to the present invention prevents the problem of leaching of contaminants, including heavy metals, by carrying a mixture of contaminated material and ground material into or under a retention layer, wherein the retention layer is situated under a water surface and/or groundwater level. As a result of arranging the mixture in or under a retention layer situated under a water layer, leaching of contaminants can only take place by means of diffusion. The force exerted on the mixture by means of diffusion is significantly lower than the gravitational force as exerted in the present use on the isolated contaminated material.

In addition, the method according to the present invention prevents further leaching by means of mixing the contaminated material with ground material before it is arranged in or under the retention layer. Mixing of the two materials results in a strong adhesion between the contaminants, including heavy metals, and the ground material. This adhesion further limits the diffusion force, which further reduces the possibility of leaching of contaminants. An isolating layer is preferably situated under the retention layer in order to further prevent leaching to the groundwater.

In an embodiment of the method according to the present invention the mixture formed in processing step c) is arranged in the retention layer above the isolating layer.

"Contaminated material" is understood to mean material having an eluate comprising one or more heavy metals in a concentration above the set intervention value. Used here as reference for copper is an intervention value of 75 µg/L. Heavy metals such as cadmium and lead have an intervention value of respectively 6 µg/L and 75 µg/L. Contaminated material can for instance comprise bottom ash. The concentrations of heavy metals in for instance bottom ash lie above the intervention values, which can cause contamination of the groundwater. Examples of bottom ash are incinerator bottom ash and E-bottom ash or coal-dust bottom ash.

The term "ground material" comprises material released from the bed or bank of a surface water body or from non-aqueous types of soil. Ground material comprises both dry and wet ground material. Dry ground material can for instance comprise soil and/or sand. Wet bottom material can for instance comprise dredged ground material such as dredge spoil, sludge or wet clay. According to the present invention the ground material is preferably not contaminated, and the concentrations of heavy metals fall within the intervention values as defined above. The ground material mixed with the contaminated material can differ from the ground material used in the retention layer.

The isolating layer according to the present invention comprises material, preferably non-contaminated ground material, such as clean soil and/or clean dredge spoil. The retention layer can for instance comprise contaminated dredge spoil.

According to the present invention the water layer can comprise a surface water layer. In this case a surface water layer can be formed by a lake or water basin.

An embodiment of the method according to the present invention further comprises of arranging and/or replenishing the retention layer. In some cases the location for storing the mixture formed in processing step c) comprises a natural retention layer consisting of ground material. In the case such a natural retention layer is absent, the present invention provides for the arranging of a retention layer consisting of non-contaminated ground material before the method according to the present invention is performed. If necessary, the retention layer can be replenished with ground material while the method is being performed. An isolating layer is more preferably arranged before the retention layer is arranged.

In some cases the isolating layer according to the present invention has a height of at least (approximately) 1 meter, this height preferably being at least approximately 2 meters in order to realize a sufficiently isolating layer.

The term "approximately" as used herein is intended to comprise values with a deviation of 10% from the stated values. The term "approximately" preferably comprises values which deviate 5% from the stated values.

In a further embodiment according to the present invention the distance between the mixture arranged in or under the retention layer and the water layer lying above the retention layer amounts to at least approximately 1 meter, this distance preferably amounting to at least approximately 2 meters.

In an embodiment of the method according to the present invention the mixture formed in processing step c) comprises a quantity by weight of the contaminated material which is a maximum of approximately 6 times the quantity by weight of the ground material. It has been found that, when the quantity by weight of the contaminated material is exceeded by more than approximately 7 times the quantity by weight of the ground material, the adhesion between the contaminants and the ground material is so low that leaching of contaminants from the mixture cannot be prevented. The quantity by weight of the contaminated material is preferably approximately 0.1 to approximately 4 times the quantity by weight of the ground material. The quantity by weight of the contaminated material is more preferably approximately 0.5 to approximately twice the quantity by weight of the ground material. The quantity by weight of the contaminated material is most preferably approximately once the quantity by weight of the ground material. It has been found that the ratio of 1 part ground material and 1 part contaminated material produces an optimal result in respect of the processing of the different supply flows of contaminated material and ground material, the processability of the mixture for pouring and the ratio of contaminated material relative to the ground material in combination with the desired adhesion of the mixture.

In another embodiment of the method according to the present invention the method further comprises of supplying water during processing step c). Both the supplied contaminated material and/or the supplied ground material comprises in practice a varying quantity of water. In order that the method according to the present invention, i.e. the mixing of the two materials and processing of the mixture, remains consistent it is possible to opt to adjust the water content in the mixture. The viscosity of the mixture is preferably increased by means of supplying water during processing step c), and the viscosity of the mixture is preferably reduced by admixing relatively dry (contaminated) material. In addition, it is possible to influence the adhesion of the mixture by means of adjusting the water content.

The water content is preferably kept as low as possible and the water content of the water present in the mixture formed in processing step c) amounts to less than approximately 20% by weight of the whole composition. The water present in the mixture formed in processing step c) more preferably amounts to less than approximately 15% by weight of the whole composition. An optimal ratio between the adhesion of the mixture and the viscosity, being the pumpability, of the mixture is achieved with a composition in which the water content amounts to approximately 10% by weight of the whole composition.

The mixture formed in processing step c) can be mixed in different ways. In an embodiment according to the present invention the method comprises of homogeneously mixing the contaminated material and the ground material, this meaning that the contaminated material is uniformly distributed in the ground material. Such a matrix prevents contaminated components leaching from the mixture formed in processing step c). In an alternative embodiment according to the present invention the method comprises a processing step c1) in which ground material and contaminated material are mixed, followed by processing step c2) in which the formed mixture is mixed with additional ground material. An advantage of the mixing comprising of two or more mixing steps is that a substantial part of the ground material will be situated in the outer layer of the mixture.

The mixture formed in processing step c) is not in contact with the water layer during processing step d) because the mixture is transported through a conduit running through the water layer. In an embodiment the conduit is a substantially vertically placed cylindrical conduit. The cylindrical conduit is preferably configured to enable up and downward movement thereof or displacement thereof in the horizontal plane relative to the ground surface.

In an alternative embodiment according to the present invention processing step c) is performed by an intelligent self-regulating system. Such an intelligent system can for instance be configured to formulate the correct mixing ratios of contaminated material and ground material. In addition, an intelligent system can be configured to regulate the supply of water before, during and after the mixing process. In the present case the intelligent self-regulating system can consist of a computer which can perform an analysis of results as generated during processing step c) and wherein the computer can, on the basis of the analysis, control the mixing ratio and the means configured to supply water. The intelligent self-regulating system preferably measures the strength of the electric current required to transport the mixture through the conduit running through the water layer.

In a further embodiment according to the present invention the method comprises a processing step e) wherein, once the mixture of contaminated material and ground material has been arranged, a mixture consisting of substantially ground material is transported through the conduit before the conduit is removed from the retention layer.

The invention further provides an installation for storing a contaminated material under a water layer, comprising at least one supply device for supplying the contaminated material, at least one supply device for supplying ground material, at least one mixing device configured to mix the contaminated material with the ground material, and at least one pouring device, wherein the pouring device intersects a water layer and debouches into or under a retention layer situated under a water layer, and wherein the retention layer comprises ground material.

In order to achieve a good mixing of the contaminated material and the ground material the mixing device is preferably provided with one or more blades. In an alternative embodiment the mixing device can also be provided with a conveyor screw. The mixing device can further be provided with one or more water supply means to enable control of the viscosity and adhesion of the mixture.

In an embodiment according to the present invention the installation is provided with an intelligent self-regulating system such as a computer. Such an intelligent self-regulating system provides the option of regulating the mixing ratios of the contaminated material and the ground material in the mixing device. In addition, the installation according to the present invention can be provided with measuring sensors which can determine the water content in the supplied contaminated material, the supplied ground material and/or the mixture formed in the mixing device. These measuring sensors are preferably connected to the intelligent self-regulating system where, on the basis of the generated results, the water supply means and the mixing system can be controlled so as to thus enable control of the water content of the mixture.

In a further embodiment the supply device for supplying contaminated material and/or the supply device for supplying ground material comprises at least one hopper for unloading the contaminated material and/or the ground material. A hopper makes it possible to unload contaminated material and/or ground material supplied by vessels into the mixing device. The installation according to the present invention preferably comprises at least two separated hopper parts to enable separate unloading of contaminated material and ground material before mixing thereof in the mixing device. Such a separated hopper device makes it possible to regulate the mixing ratio of the contaminated material and the ground material.

In an alternative embodiment according to the present invention the supply device for supplying ground material comprises a floating conduit. The floating conduit for supplying ground material is preferably connected to a sand dredger or cutter suction dredger, or the floating conduit is connected to a trailing suction hopper dredger.

In a further embodiment according to the present invention the pouring device comprises a substantially vertically placed conduit. The conduit further comprises a conveyor screw with which the mixture of contaminated material and ground material is transported through the conduit in the direction of the retention layer. Such a conveyor screw has the further advantage that the mixture of contaminated material and ground material can be pressed into the retention layer and thereby bring about a stronger adhesion, being a further limitation of the diffusion force.

The invention further provides a composition for storing contaminated material under a water layer, comprising a mixture of the contaminated material and ground material, wherein the contaminated material and the ground material are mixed homogeneously and wherein the quantity by weight of contaminated material is a maximum of approximately 6 times the quantity by weight of the ground material.

The composition preferably comprises a quantity by weight of contaminated material which is approximately 0.5 to approximately 5 times the quantity by weight of the ground material. The quantity by weight of the contaminated material is preferably approximately 0.1 to approximately 4 times the quantity by weight of the ground material. The quantity by weight of the contaminated material is more preferably approximately 0.5 to approximately twice the quantity by weight of the ground material. The quantity by weight of the contaminated material is most preferably approximately once the quantity by weight of the ground material.

In a further embodiment according to the present invention the composition comprises a water content of less than approximately 20% by weight of the whole composition. The composition more preferably comprises a water content of less than approximately 15% by weight of the whole composition. An optimal ratio between the adhesion of the mixture and the viscosity, being the pumpability, of the mixture is achieved with a composition in which the water content amounts to about 10% by weight of the whole composition.

In another embodiment the contaminated material of the composition comprises bottom ash, such as incinerator bottom ash, E-bottom ash or coal-dust bottom ash, and the ground material of the composition comprises dredged ground material such as dredge spoil.

BRIEF DESCRIPTION OF THE DRAWINGS

The present invention will now be further elucidated with reference to the accompanying drawings, in which.

DESCRIPTION OF THE INVENTION

Figure 1:
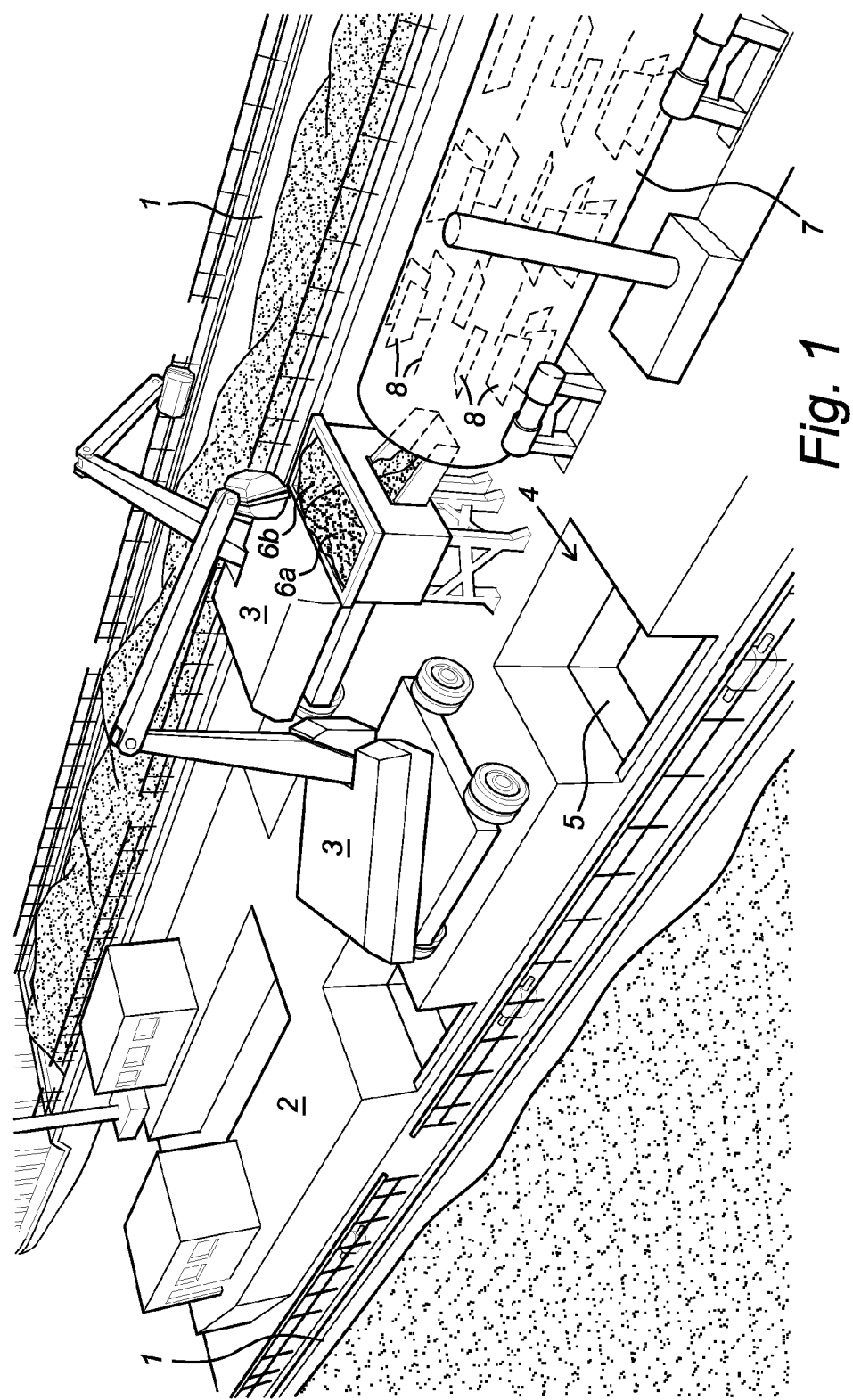
FIG. 1 shows a loading and unloading installation for supplying and mixing contaminated material and ground material.

FIG. 1 shows an embodiment of the installation according to the present invention in which vessels 1 containing ground material and/or contaminated material are moored at a floating device 2, such as a pontoon or body of a suction cutter dredger or trailing suction hopper dredger, on which gripping device 3, such as a crane provided with a sorting gripper, is stationed for the purpose of unloading the supplied contaminated material and/or supplied ground material from vessels 1. Floating device 2 is further provided with chutes 4 comprising conveyor belts 5 for pouring ground material, such as dredge spoil, sludge, sand or other similar materials or clean dredged material, below the water surface. In addition, floating device 2 comprises two mutually separated hoppers configured to unload contaminated material 6a and ground material 6b before mixing of these two starting materials in mixing device 7. Mixing device 7 comprises a substantially closed container with an inlet and an outlet. Accommodated in the container are a number of blades 8 which are arranged on a central shaft and which provide for a good mixing of the materials. Mixing device 7 can further comprise measuring means (not shown here) which determine the water content of the two starting materials in the different hoppers, as well as the water content of the mixture in the mixing device. The mixing device can further comprise water supply and discharge means (not shown here) which can discharge excess water or, where necessary, can provide the mixture with extra water in order to regulate the viscosity of the mixture. The installation can further comprise an intelligent self-regulating system (not shown here), such as a computer, which is connected to the measuring means and the water supply and discharge means in order to regulate the water content in the mixture. In addition, the intelligent self-regulating system can be connected to a means (not shown here) which determines the mixing ratio of contaminated material and ground material.

Figure 2:
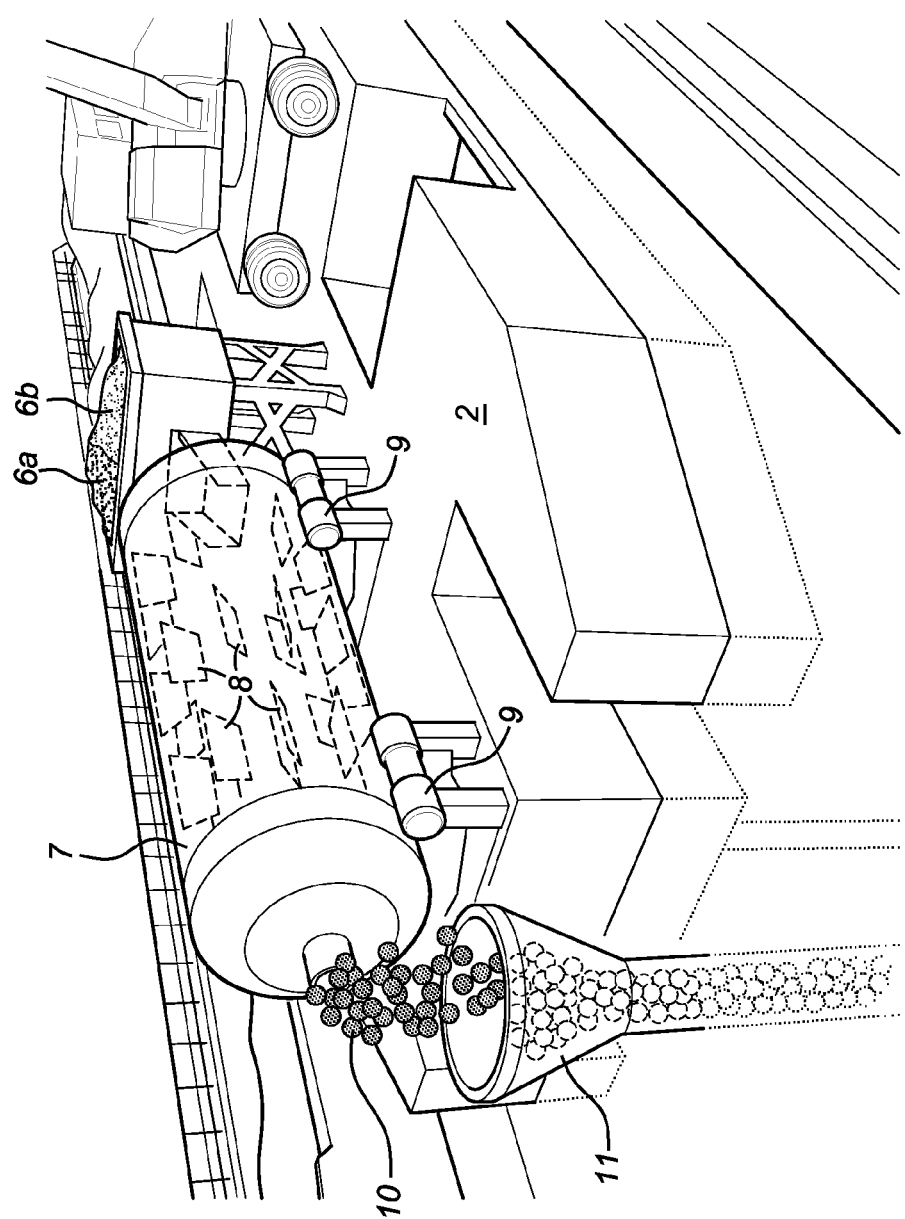
FIG. 2 shows a mixing device for mixing and pouring contaminated material and ground material.

FIG. 2 shows an embodiment of the installation according to the present invention in which two separated hoppers are placed on a floating device 2 for the purpose of supplying contaminated material 6a and ground material 6b to a mixing device 7 comprising blades 8. The mixing device is rotated about the longitudinal axis by rotation means 9 which engage on the outer surface of the container of mixing device 7. In another embodiment mixing device 7 comprises a screw (not shown here) for mixing the two starting materials. The mixture 10 of contaminated material and ground material formed in mixing device 7 is then poured into a pouring device 11.

Figure 3:
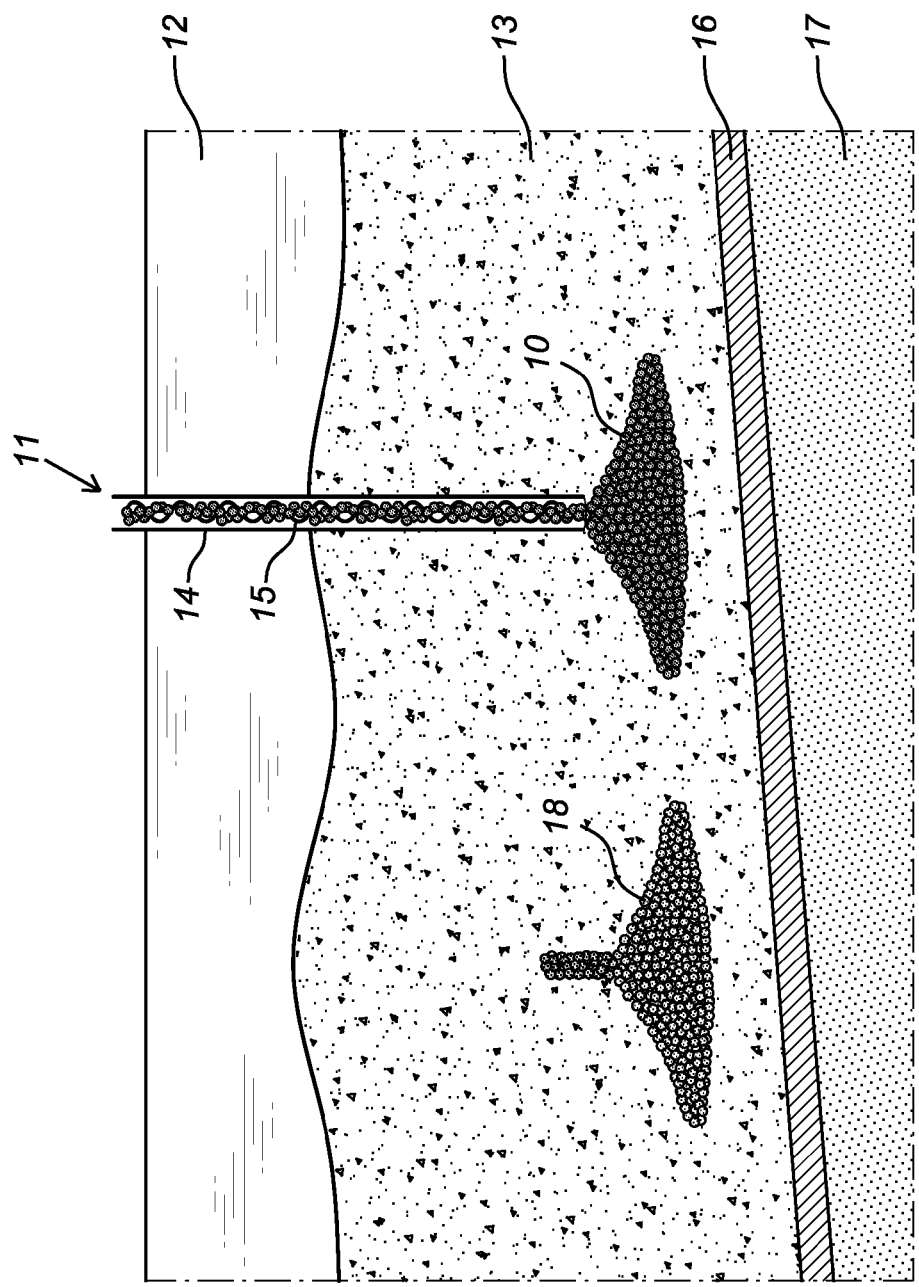
FIG. 3 shows a pouring device debouching into a retention layer.

FIG. 3 shows a pouring device 11 which is positioned substantially vertically and intersects a water layer 12 and debouches into a retention layer 13, which in the present invention comprises ground material. Retention layer 13 can already be present, or has been carried under the water surface from floating device 2 through chutes 4. The pouring device comprises a throughfeed conduit 14, such as a cylindrical tube, comprising a conveyor screw 15 which presses the mixture 10 of contaminated material and ground material into retention layer 13. Retention layer 13 can be provided on the underside with an isolating layer 16 comprising clean dredged material. Isolating layer 16 is preferably arranged on a sand bed 17. FIG. 3 further shows an already arranged quantity of mixture 18 of contaminated material and ground material.

Figure 4:
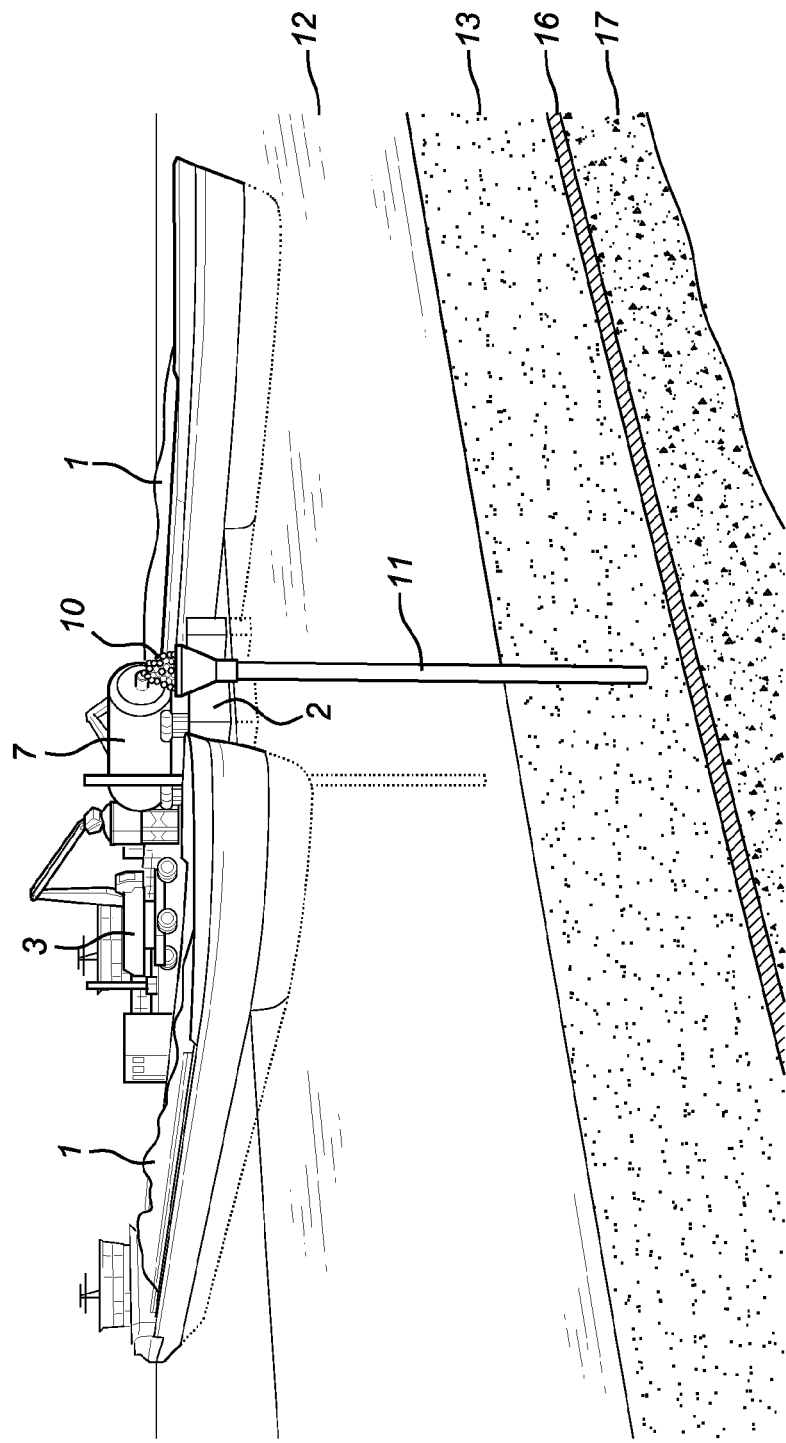
FIG. 4 shows an overall view of an embodiment of the installation according to the present invention.

FIG. 4 shows an overall view of an embodiment of the installation, comprising vessels 1 for supplying contaminated material and/or ground material and a gripping device 3 positioned on a floating device 2 for the purpose of unloading materials which are mixed in a mixing device 7. The mixture 10 of contaminated material and/or ground material is poured into a retention layer 13 by means of a pouring device 11, wherein the pouring device intersects a water layer 12 and debouches into retention layer 13. An isolating layer 16 can be arranged under retention layer 13, wherein isolating layer 16 rests on a sand bed 17.

The invention claimed is:

1. An installation for storing a contaminated material under a water layer, comprising:
   at least one supply device for supplying the contaminated material;
   at least one supply device for supplying ground material;
   at least one mixing device configured to mix the contaminated material with the ground material; and
   at least one pouring device,
   wherein the pouring device comprises a substantially vertically placed conduit comprising a conveyor screw, wherein one end of the conduit is positioned above a water layer, an other end of the conduit is positioned in or beneath a retention layer, and the conduit intersects the water layer,
   wherein the mixture of contaminated material and ground material is transported through the conduit and under the water layer into or beneath the retention layer, and
   wherein the retention layer situated under the water layer comprises ground material.

2. The installation as claimed in claim 1, wherein the mixing device is provided with one or more blades.

3. The installation as claimed in claim 1, wherein the mixing device is provided with one or more water supply source.

4. The installation as claimed in claim 1, wherein an isolating layer is situated under the retention layer.

5. The installation as claimed in claim 1, wherein a mixture of the contaminated material with the ground material is arranged in the retention layer above an isolating layer.

6. The installation as claimed in claim 1, wherein the contaminated material comprises bottom ash.

7. The installation as claimed in claim 1, wherein the supply ground material or the ground material in the retention layer comprises dredged ground material and/or dry ground material.

8. The installation as claimed in claim 1, wherein an isolating layer provided on an underside of the retention layer comprises non-contaminated dredge spoil.

* * * * *